Patented Apr. 7, 1953

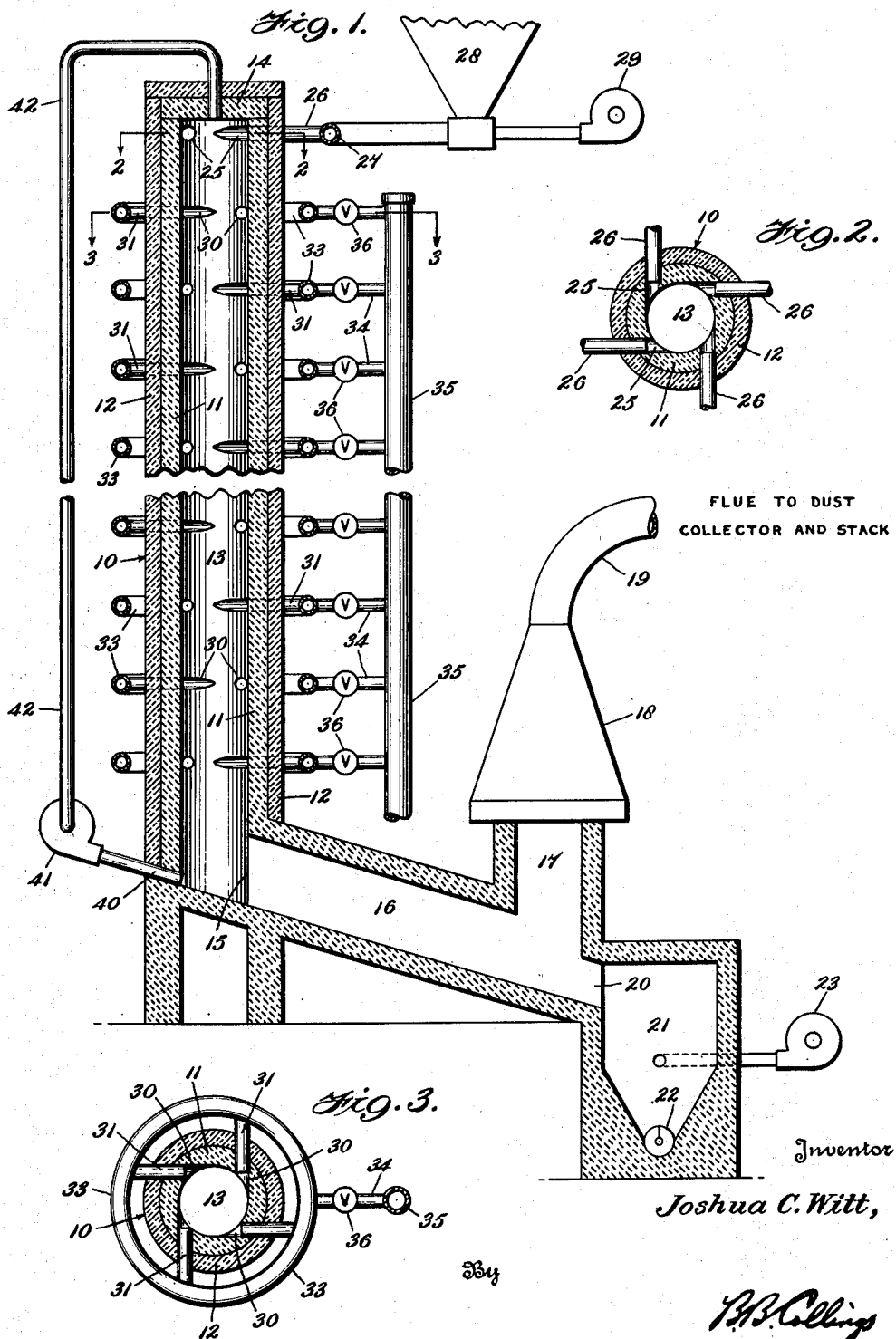

2,634,116

UNITED STATES PATENT OFFICE 2,634,116

METHOD OF AND APPARATUS FOR CLINKERING CEMENT RAW MATERIALS AND THE LIKE

Joshua Chitwood Witt, Chicago, Ill.

Application September 26, 1949, Serial No. 117,920

5 Claims. (Cl. 263—29)

This invention relates to the production of hydraulic cement, and has for its principal object the provision of an improved method of and apparatus for clinkering finely divided Portland cement-making materials.

The invention has for a further object the overcoming of many of the deficiencies of the methods and apparatus heretofore proposed and/or employed, whereby to provide a commercially practical mode of continuously clinkering cement raw mix and similar materials in stationary shafts or kilns of relatively short length as compared to that of the rotary kilns now most commonly used for the purpose, with material savings in the costs of manufacture, installation, maintenance and operation, and by which a high percentage of substantially uniform completely clinkered product may be obtained by a single passage of the materials through the apparatus. The clinkering chamber may be a stationary vertical or inclined shaft, or even a stationary horizontal kiln, of appropriate cross sectional area and shape, and a length not exceeding 100 feet.

In its broadest aspect the invention comprises the establishment and maintenance of a relatively high velocity whirling or cyclonically moving mass of burning fuel and hot gases in each of a multiplicity of longitudinally contiguous zones throughout the length of an elongated chamber, the burning masses in adjacent zones preferably whirling in opposite directions about the chamber axis and intremingling to produce a high degree of turbulence and a more or less uniform clinkering temperature in all parts of the chamber; the continual movement of the components of the burning masses longitudinally of the chamber to an exit port at one end thereof; the continuous feeding of the finely divided raw materials at relatively high velocity into the other end of the chamber for immediate high velocity contact of the individual raw mix particles with the burning fuel and their movement serially through the several zones of the chamber to the exit port, said particles being continuously subjected to said substantially uniform clinkering temperature from beginning to end of their traverse through the chamber, whereby a high percentage of them become completely clinkered by the time they reach said port; the continuous discharge of the products of combustion and their burden of clinkered materials through said exit port of the chamber; and the separation of the clinkered materials from the combustion products.

More specifically, and with particular reference to the exemplification shown in the accompanying drawing, the invention comprises the introduction of dry pulverized raw materials into one end of a stationary shaft or kiln at a velocity on the order of 75 feet or more per second, and in a whirling or cyclonic manner relative to the shaft axis; the introduction into the shaft, at a multiplicity of points spaced throughout substantially its entire length, of high velocity cyclonically moving masses of burning fuel, such as gas, oil or powdered coal, the masses in longitudinally adjacent zones of the chamber whirling in opposite directions and intermingling to produce a high degree of turbulence and substantially uniform clinkering temperatures throughout all portions of the chamber; discharging the gaseous products of combustion and the clinkered materials carried thereby in a stream from the end of the chamber opposite that at which the raw materials are introduced; and effecting an abrupt change in the direction of movement of the discharged gases, whereby the inertia of the clinkered solids will discharge them from said stream.

The length of the chamber is such, with regard to the temperatures and velocities employed, as to provide a time of contact between the raw materials and the mass of flame and hot gases sufficient to insure complete clinkering of substantially all of said materials, but in no case need such length exceed 100 feet and in most instances it may be substantially less.

The invention further comprises the steps and combinations of steps constituting the method, and the combinations and arrangements of parts constituting the apparatus, more fully described below and particularly pointed out in the claims.

In the accompanying drawing forming a part of this specification there is illustrated somewhat diagrammatically the essential elements of one form of apparatus suitable for carrying out the present method of clinkering cement raw mix. In the said drawing, in which like reference characters designate like parts in all the views:

Figure 1 is a vertical sectional view, partly in elevation, of the apparatus; and Figs. 2 and 3 are cross sectional views, taken on the planes indicated respectively by the lines 2—2 and 3—3 in Fig. 1, looking down.

Referring to said drawing in detail, 10 designates a vertical shaft, the walls of which comprise a refractory lining 11 surrounded by a layer of heat insulating material 12, providing an elongated clinkering chamber 13 of circular cross section. The chamber is closed at its top by a cap 14, and at its bottom it has an open port 15 communicating with a somewhat downwardly inclined laterally extending discharge passage 16 having an abruptly angular off-take 17 communicating with a hood 18 and a flue 19 which extends to an appropriate dust collector and thence to a stack which will provide a draft downwardly through the chamber 13. If desired, a fan or blower may be interposed in the flue 19 to assist in maintaining the draft, but since this as well as the dust collector and stack are common expedients in the art, such elements have not been shown in the drawing.

At or near the junction of the passages 16 and 17 the passage wall is provided with a port 20 through which the clinker may be discharged into a collecting and cooling chamber 21, as will appear more fully below. The clinker is removed from said chamber by a screw or other suitable conveyer 22, and cooling air may be forced into and through this chamber by a fan or blower 23.

Adjacent the top of the shaft 10 its wall is provided with a set of raw mix induction ports comprising tangentially disposed passages 25 which communicate by means of pipes 26 with a manifold 27 to which the pulverized raw materials may be supplied by any suitable feeding mechanism, here conventionally indicated as comprising a hopper 28 for containing the materials, and a blower or pump 29 for supplying a current of air to entrain and carry said materials at relatively high velocity through manifold 27, pipes 26 and induction ports 25 into chamber 13.

Below the raw mix induction ports 25 the wall of the shaft 10, throughout substantially its entire height, is pierced with a multiplicity of fuel induction ports arranged in vertically spaced sets, each of which comprises a plurality of tangentially disposed passages 30 discharging into a horizontal zone of the chamber 13, which zones are longitudinally contiguous from one end of the chamber to the other. As here shown, the uppermost set of passages 30 and each alternate set therebelow discharges into the chamber 13 in a direction opposite to that in which the raw mix induction passages 25 discharge, while the remaining sets of fuel passages discharge in the same direction as said raw mix passages. While this arrangement insures maximum turbulence in the burning fuel mass and temperature uniformity throughout the length of the chamber, in some instances at least some adjacent sets of fuel passages 30 may discharge in the same direction.

Each passage 30 houses a nozzle or burner 31 and the nozzles of each set are connected to a manifold 33, the several manifolds in turn being connected by pipes 34 to a header 35 connected to a fuel supply. Each of the pipes 34 may be provided with a valve 36, whereby to control each set of burners. The arrangement here shown is a more or less conventional illustration of a fuel supplying apparatus in which gas is the fuel employed, and of course the specific details thereof will be varied as necessary if oil or powdered coal is to be used.

In preparing clinker in the apparatus just described, fuel issuing from the several sets of burners 31 is ignited, producing a multiplicity of counter-cyclonically moving high velocity masses of flame and hot gases in a series of longitudinally contiguous zones from top to bottom of the chamber 13. After a suitable preheating period, the pulverized raw materials are introduced at high velocity through the tangential ports 25 and immediately meet the high velocity oppositely whirling mass of flame and hot gases from the uppermost set of burners 31. A state of extreme turbulence is created by such meeting which tends to insure individual contact of the material particles with the hot gases and this is substantially maintained throughout the clinkering operation due to the alternating cyclonic movements of the several masses of burning fuel which the materials encounter as they pass serially through the superposed zones of the chamber. Thus, the said particles may attain clinkering temperature comparatively rapidly and be completely clinkered by the time they reach the exit port 15, which traverse ordinarily is completed in less than one minute.

The alternating whirling movements of the fuel masses in the several zones also produce a scouring action on the raw mix and fuel particles which tends (a) to remove the film of air adsorbed by each raw mix particle when it enters the chamber; (b) to remove the layer of carbon dioxide which forms around each raw mix particle, due to calcination of carbonates; and (c) to remove carbon dioxide from the burning fuel particles and substitute therefor oxygen from the atmosphere.

As each set of burner nozzles 31 is continuously discharging a certain volume of flame and hot gases into its particular zone of the chamber 13, and since said chamber is provided with but one exit port 15 through which the products of combustion may escape, it follows that irrespective of the draft created by the stack and/or fan associated with the flue 19, continuous movement of the flame and hot gases in the chamber will be maintained longitudinally thereof toward the port 15. As the raw materials are introduced adjacent the closed end 14 of the chamber and likewise may exit only through the port 15, their travel through the chamber is in the same direction as and concomitant with that of the flame and hot gases.

As the gaseous products of combustion and the clinkered materials carried thereby pass through the discharge duct 16 the draft from the stack will draw most of the gases upwardly through the off-take 17, thus imparting a sharp change of direction to their movement. However, the inertia of the clinkered solids will cause most of them to continue through the port 20 and into the collecting and cooling chamber 21, from which they may be removed by the conveyer 22 for further processing by conventional procedures. Any solids drawn upwardly through the off-take 17, hood 18 and flue 19 will be separated from the gases by the dust collector, and may be recovered therefrom.

To avoid undesirable deposit and piling up of the clinkered solids at the bottom of the shaft 10, due to the change in direction of movement of the gases as they pass through port 15 and into discharge passage 16, one or more nozzles 40 may be located in the shaft wall in line with the bottom of said passage, through which nozzles a blast of air or hot gases may be projected by a fan or blower 41. In the example shown in the drawing, a duct 42 supplies hot gases from the upper part of the chamber 13 to the intake of such blower.

While the apparatus here shown is intended to operate on the "down-draft" principle, the method is equally susceptible of being carried out in an "up-draft" apparatus, i. e., one in which the exit port 15 is located at the top of the shaft and the raw mix feed ports 25 are adjacent the bottom thereof; and as previously stated, the shaft need not necessarily be vertical.

The time necessary to effect clinkering by this process will depend somewhat upon the temperatures employed (which may vary within the usual limits) and the height of the shaft in turn will be dependent upon the time element. However, when operating at temperatures on the order of 2800° F. to 3000° F., satisfactory clinker may be produced as a result of contact between the raw mix particles and burning fuel for less than one minute, and such contact may be attained in an apparatus of the character above described in which the height of the shaft ranges from 30 to 100 feet.

While velocities on the order of 75 feet per second have been mentioned above in connection with the introduction of the raw mix and fuel into the clinkering chamber, this is intended merely as illustrative of what is meant by "relatively high velocity" as herein employed, and not as a specific limitation thereto.

What is claimed is:

1. In the manufacture of Portland cement and the like, the method of clinkering finely divided raw materials which comprises maintaining a turbulent mass of burning fuel throughout all portions of an elongated chamber by cyclonically introducing said fuel at relatively high velocity into each of a series of longitudinally contiguous zones of the chamber, the cyclonic motion of the fuel in some of said zones being in a direction opposite to that of the fuel in other of the zones; discharging the products of combustion from one end of the chamber whereby to maintain a longitudinal flow of flame and hot gases therein; introducing the finely divided raw materials into the other end of the chamber for high velocity contact with the burning mass and clinkering traverse therewith serially through the several zones of the chamber; and separating the clinkered materials from the discharged combustion products.

2. In the manufacture of Portland cement and the like, the method of clinkering finely divided raw materials which comprises maintaining a turbulent mass of burning fuel throughout all portions of an elongated chamber by cyclonically introducing said fuel at relatively high velocity into each of a series of longitudinally contiguous zones of the chamber, said series extending from end to end of the chamber, and the cyclonic motion of the fuel in alternate zones being in a direction opposite to that of the fuel in the remaining zones; discharging the products of combustion from one end of the chamber to induce a longitudinal flow of flame and hot gases therein; pressurally introducing the finely divided raw materials into the other end of the chamber for immediate high velocity contact of the material particles with the burning fuel mass, the longitudinal movement of the latter carrying the clinkering particles serially through the several zones of the chamber; and separating the clinkered materials from the discharged combustion products.

3. In the manufacture of Portland cement and the like, the method of clinkering finely divided raw materials which comprises continuously cyclonically introducing burning fuel at high velocity into each of a series of longitudinally contiguous zones throughout the length of an elongated chamber, the cyclonic motion of the fuel in some of the zones being in a direction opposite to that of the fuel in other of the zones, whereby to maintain a turbulent mass of burning fuel and substantially uniform clinkering temperatures in all portions of the chamber; discharging the products of combustion from one end only of the chamber, whereby to maintain a longitudinal flow of flame and hot gases therein toward said end; introducing the finely divided raw materials into the other end of the chamber for immediate high velocity contact of the discrete particles with the burning fuel mass and movement concomitantly therewith serially through the several zones of the chamber, whereby said particles will be clinkered and discharged from the exit end of the chamber suspended in the stream of combustion products; and effecting an abrupt change in the direction of movement of the discharged combustion products whereby the inertia of the clinkered solids may separate them from such products.

4. In apparatus for clinkering finely divided cement raw materials and the like, the combination of means providing an elongated clinkering chamber closed at one end and having a discharge port at its other end; a multiplicity of sets of fuel feeding devices spaced longitudinally of the chamber throughout its length, each set comprising a plurality of nozzles discharging tangentially into one of a series of longitudinally contiguous zones of the chamber, some of the sets discharging in one direction and some in an opposite direction, whereby to provide a turbulent mass of burning fuel and substantially uniform clinkering temperatures in all parts of the chamber; means for cyclonically introducing the finely divided raw materials into the chamber adjacent its closed end for high velocity contact with the burning mass and travel serially through the several zones of the chamber to said discharge port; and a discharge conduit leading from said port.

5. In apparatus for clinkering finely divided cement raw materials and the like, the combination of means providing an elongated clinkering chamber closed at one end and having a discharge port at its other end; high velocity fuel feeding devices spaced longitudinally along the chamber throughout its length and discharging cyclonically into a series of longitudinally contiguous zones of the chamber, the devices feeding adjacent zones being arranged to discharge in opposite directions whereby to provide a turbulent mass of burning fuel and substantially uniform clinkering temperatures in all parts of the chamber, the components of which mass move longitudinally of the chamber from its closed end to said discharge port; means for pressurally introducing the finely divided raw materials into the chamber adjacent its closed end for high velocity contact of the material particles with the burning mass and their traverse concomitantly therewith serially through the several zones of the chamber to the discharge port; and a discharge conduit leading from said port, for conducting the products of combustion and their burden of clinkered materials therefrom.

JOSHUA CHITWOOD WITT.

REFERENCES CITED

The following references are of record in the file of this patent:

UNITED STATES PATENTS

| Number | Name | Date |
|---|---|---|
| 1,847,527 | Greene | Mar. 1, 1932 |
| 2,161,180 | Marx | June 6, 1939 |
| 2,187,538 | Butler | Jan. 16, 1940 |
| 2,306,462 | Moorman | Dec. 29, 1942 |